US010462622B2

(12) United States Patent
Yan

(10) Patent No.: US 10,462,622 B2
(45) Date of Patent: Oct. 29, 2019

(54) MANAGING DELIVERY OF MESSAGES TO NON-STATIONARY MOBILE CLIENTS

(71) Applicant: Facebook, Inc., Menlo Park, CA (US)

(72) Inventor: Hong Yan, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 19 days.

(21) Appl. No.: 15/860,470

(22) Filed: Jan. 2, 2018

(65) Prior Publication Data

US 2019/0208372 A1    Jul. 4, 2019

(51) Int. Cl.
*H04W 4/21* (2018.01)
*H04W 4/12* (2009.01)
*G06N 5/02* (2006.01)
*H04M 7/00* (2006.01)
*H04L 12/58* (2006.01)
*H04W 4/14* (2009.01)
*G06Q 30/02* (2012.01)
*G06N 20/00* (2019.01)

(52) U.S. Cl.
CPC .............. *H04W 4/21* (2018.02); *G06N 5/022* (2013.01); *H04L 51/26* (2013.01); *H04L 51/38* (2013.01); *H04M 7/0048* (2013.01); *H04W 4/12* (2013.01); *H04W 4/14* (2013.01); *G06N 20/00* (2019.01); *G06Q 30/0277* (2013.01); *H04L 51/32* (2013.01); *H04M 2203/655* (2013.01)

(58) Field of Classification Search
CPC ........... H04W 4/12; H04W 4/21; H04W 4/14; G06N 5/022; H04L 51/32; H04L 51/26; H04L 51/38; H04M 7/0048; H04M 2203/655
See application file for complete search history.

(56) References Cited

U.S. PATENT DOCUMENTS

| | | | | |
|---|---|---|---|---|
| 2009/0150489 | A1* | 6/2009 | Davis | G06Q 10/107 709/204 |
| 2011/0151842 | A1* | 6/2011 | Olincy | H04M 3/42348 455/414.1 |
| 2013/0339453 | A1* | 12/2013 | Aggarwal | H04L 51/20 709/206 |
| 2015/0312409 | A1* | 10/2015 | Czarnecki | H04M 3/42093 455/414.1 |
| 2016/0270025 | A1* | 9/2016 | Osann, Jr. | H04W 64/006 |
| 2017/0125019 | A1* | 5/2017 | Ganesan | H04M 1/72591 |
| 2017/0127255 | A1* | 5/2017 | Archer | H04W 4/16 |
| 2018/0359207 | A1* | 12/2018 | Chatterjee | H04L 51/24 |

* cited by examiner

*Primary Examiner* — Michael Jung
(74) *Attorney, Agent, or Firm* — Baker Botts L.L.P.

(57) ABSTRACT

In one embodiment, a method includes managing delivery of messages to non-stationary mobile clients. A computing system receives a request from a first user to send a message to a second user. The computing system then accesses the location information of the second user which includes the velocity of the mobile client of the second user. The computing system further accesses the activity information of the second user which indicates if the second user is currently active on a social-networking application. If the velocity indicates that the second user is non-stationary, the computing system then determines an activity-level of the second user. If the activity-level is below a threshold activity-level, the computing system confirms with the first user whether the message to the second user should be sent. If the activity-level is above a threshold activity-level, the computing system sends the message to the receiver.

21 Claims, 12 Drawing Sheets

1000

| Activity-Level Index ||
|---|---|
| USER ID | Activity-Level |
| 1 | 1 |
| ⋮ | ⋮ |
| 1001 | 7 |
| ⋮ | ⋮ |
| 10003 | 5 |
| ⋮ | ⋮ |
| 13755 | 2 |
| ⋮ | ⋮ |
| 586206840 | 4 |
| ⋮ | ⋮ |
| 213708728685 | 9 |
| ⋮ | ⋮ |

*FIG. 10*

MANAGING DELIVERY OF MESSAGES TO NON-STATIONARY MOBILE CLIENTS

TECHNICAL FIELD

This disclosure generally relates to managing delivery of messages to non-stationary mobile clients within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile client device—such as a smartphone, tablet computer, or laptop computer—may include functionality for determining its location, velocity, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile client devices may also execute software applications, such as games, web browsers, or social-networking applications.

SUMMARY OF PARTICULAR EMBODIMENTS

In particular embodiments, a messaging system may improve the management of delivering messages to the mobile client of a non-stationary user (receiver) from another user (sender). The messaging system may automatically detect that the receiver is non-stationary and active at a certain activity-level on another application (e.g., the receiver is actively browsing their newsfeed on a social-networking application, or the receiver has closed the social-networking application on his/her mobile client), and accordingly perform a particular protocol for delivering the message from the sender to the receiver. The protocol may decrease the likelihood that the message is sent to the receiver when the receiver is engaged in another activity. The messaging system may base its detection on the receiver's velocity and whether the receiver is currently active on another application the messaging system can monitor (e.g., the messaging application may have access to activity information from a social-networking application on the mobile client of the receiver). The messaging system may further determine that the receiver's activity information indicates the user is engaged in another activity and thus is unlikely to respond to the sender's message or may be distracted by the sender's message (e.g., the receiver is moving at a relatively high velocity) based on a machine-learning model. The messaging system may subsequently send a confirmation prompt to the sender asking the sender to confirm that the message should be sent. If the sender confirms that the message should be sent, the messaging system may perform a particular protocol for delivering the message, which may include holding the message until the messaging system detects the user's activity-level indicates that the user is able to respond to the message, sending the message as an audio file, prompting the sender to call the receiver (rather than sending the message), or other suitable actions. Although this disclosure describes managing the delivery of messages via a messaging system, this disclosure contemplates managing the delivery of any suitable type of communication (e.g., phone calls, video calls, etc.) via any suitable system.

In particular embodiments, a messaging system may receive, from a first mobile client associated with a first user via a messaging application running on the first mobile client, a request to send a message to a second user. In particular embodiments, the messaging system may access location information associated with the second user. The location information may comprise a velocity of the second mobile client. In particular embodiments, the messaging system may access activity information associated with the second user. The activity information may indicate whether the second user is currently active on another application running on the second mobile client. If the velocity of the second mobile client indicates the second mobile client is non-stationary, the messaging system may determine an activity-level of the second user with respect to the second mobile client based on whether the second user is currently active on another application running on the second mobile client. If the activity-level is determined to be below a threshold activity-level, the messaging system may send, to the first mobile client associated with the first user via the messaging application running on the first mobile client, a confirmation prompt for display to the first user. The confirmation prompt may be operable to allow the first user to confirm whether the message to the second user should be sent. If the activity-level is determined to be above a threshold activity-level, the messaging system may send, to the second mobile client associated with the second user via a messaging application running on the second mobile client, the message from the first user.

Certain technical challenges exist for achieving the goal of managing delivering messages to a mobile client of a non-stationary user (receiver) who may be engaged in another activity and therefore may not be able to respond to the messages or may be distracted by the messages. One technical challenge includes accurately detecting if a receiver is currently engaged in another activity. Specifically, detecting that a receiver is non-stationary is not sufficient to conclude that the receiver is engaged in another activity. For example, a receiver moving at a speed of 10 miles per hour is not necessarily engaged in the activity of riding a bicycle. The receiver may be in a passenger in a pedicab or rickshaw and therefore the receiver may be able to respond to a message without being distracted. To address the above challenge, the solutions presented by the embodiments disclosed herein comprise a progressive approach by first detecting the velocity of a user, then detecting if the user is active on another application running on his/her mobile client, and further determining the activity-level of the user with respect to the application. Another technical challenge includes developing effective methods to determine the activity-level of the user with respect to the application running on his/her mobile client. To address this challenge, the embodiments disclosed herein present a solution by collecting one or more signals that are particularly useful for detecting the activity-level on an application running on a mobile client and training a machine-learning model based on these signals. A third technical challenge includes improving the robustness of the machine-learning model and tailoring the machine-learning model for a particular user. Correspondingly, the embodiments disclosed herein present a solution by collecting signals from a plurality of users having common attributes with the particular user, training a machine-learning model using these signals, and adjusting the machine-learning model based on the profile information of the particular user.

Certain embodiments disclosed herein may provide one or more technical advantages. A technical advantage of the embodiments may include preventing users who are engaged in other activities from being distracted by incoming messages. Another technical advantage of the embodiments may include providing similar functionality to a variety of messaging applications running on mobile clients such as SMS, iMessage, Facebook Messenger, Whatsapp, Snapchat, etc. Another technical advantage of the embodiments may include delivering third-party content to a user more effectively (e.g., advertising) based on the activity-level information of the user with respect to an application running on the mobile client of the user. For example, if the system determines that a user's activity-level is always higher on Instagram than on Facebook, the system may display more advertisement on Instagram.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 10 illustrates an example activity-level index.

DESCRIPTION OF EXAMPLE EMBODIMENTS

System Overview

Figure 1:
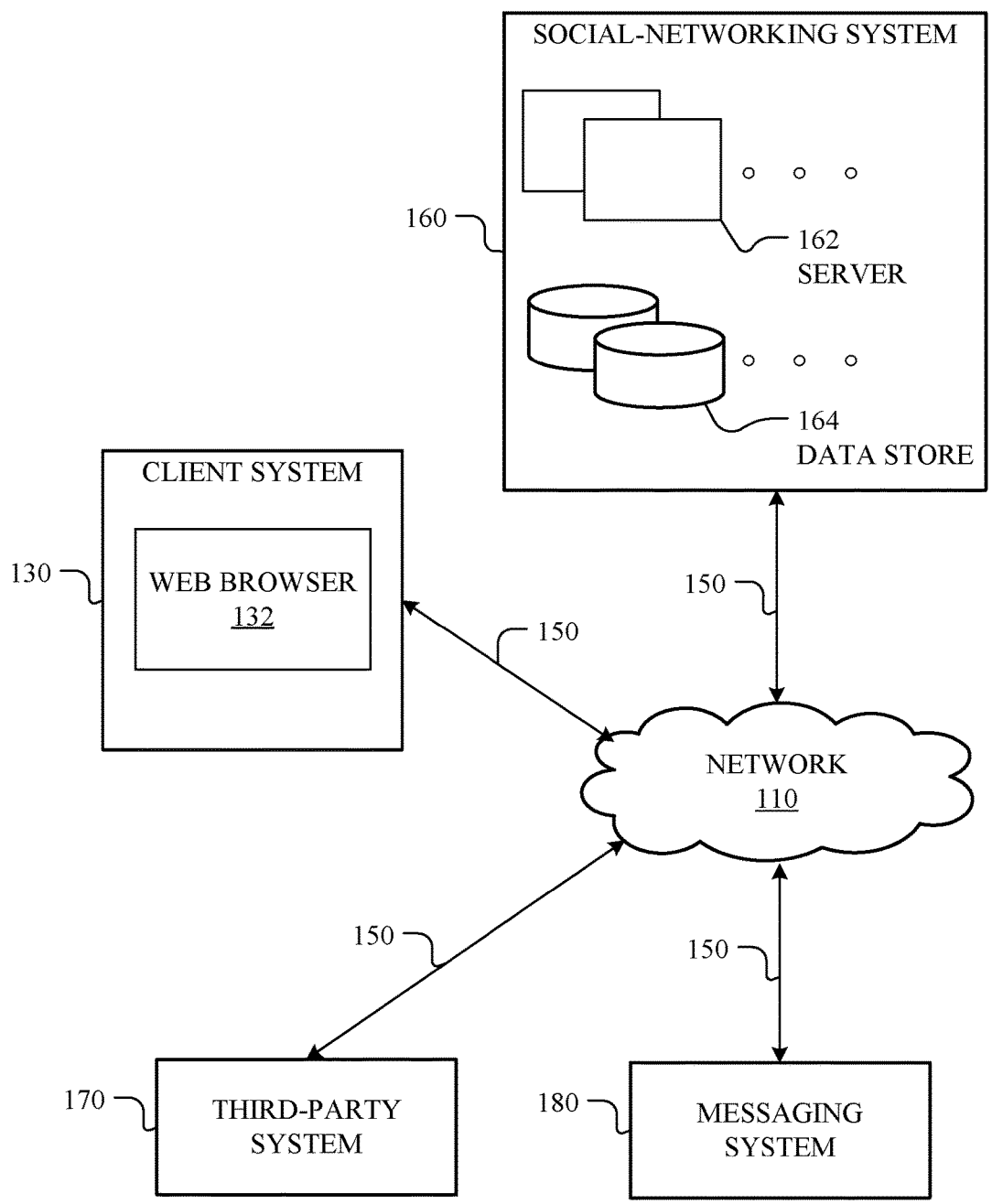
FIG. 1 illustrates an example network environment associated with a social-networking system.

FIG. 1 illustrates an example network environment 100 associated with a social-networking system. Network environment 100 includes a client system 130, a social-networking system 160, a third-party system 170, and a messaging system 180 connected to each other by a network 110. Although FIG. 1 illustrates a particular arrangement of a client system 130, a social-networking system 160, a third-party system 170, a messaging system 180, and a network 110, this disclosure contemplates any suitable arrangement of a client system 130, a social-networking system 160, a third-party system 170, a messaging system 180, and a network 110. As an example and not by way of limitation, two or more of a client system 130, a social-networking system 160, a third-party system 170, and a messaging system 180 may be connected to each other directly, bypassing a network 110. As another example, two or more of a client system 130, a social-networking system 160, a third-party system 170, and a messaging system 180 may be physically or logically co-located with each other in whole or in part. Moreover, although FIG. 1 illustrates a particular number of client systems 130, social-networking systems 160, third-party systems 170, messaging systems 180, and networks 110, this disclosure contemplates any suitable number of client systems 130, social-networking systems 160, third-party systems 170, messaging systems 180, and networks 110. As an example and not by way of limitation, network environment 100 may include multiple client systems 130, social-networking systems 160, third-party systems 170, messaging systems 180, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, a third-party system 170, and a messaging system 180 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, a server associated with a third-party system 170, or a server associated with a messaging system 180), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, a third-party system 170, or a messaging system 180 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170 or a messaging system 180, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or messaging systems 180, or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, a messaging system 180 may include one or more types of servers, one or more data stores, one or more interfaces, including but not limited to APIs, one or more web services, one or more content sources, one or more networks, or any other suitable components, e.g., that servers may communicate with. A messaging system 180 may be operated by a different entity from an entity operating the social-networking system 160. In particular embodiments, however, the social-networking system 160 and messaging systems 180 may operate in conjunction with each other to provide social-networking services to users of the social-networking system 160 or messaging systems 180. In this sense, the social-networking system 160 may provide a platform, or backbone, which other systems, such as messaging systems 180, may use to provide social-networking services and functionality to users across the Internet.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170, or one or more messaging systems 180 via a network 110. The web server may include a mail server or other messaging functionality for receiving and routing messages between the social-networking system 160 and one or more client systems 130. An API-request server may allow a third-party system 170 or a messaging system 180 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170 or a messaging system 180), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
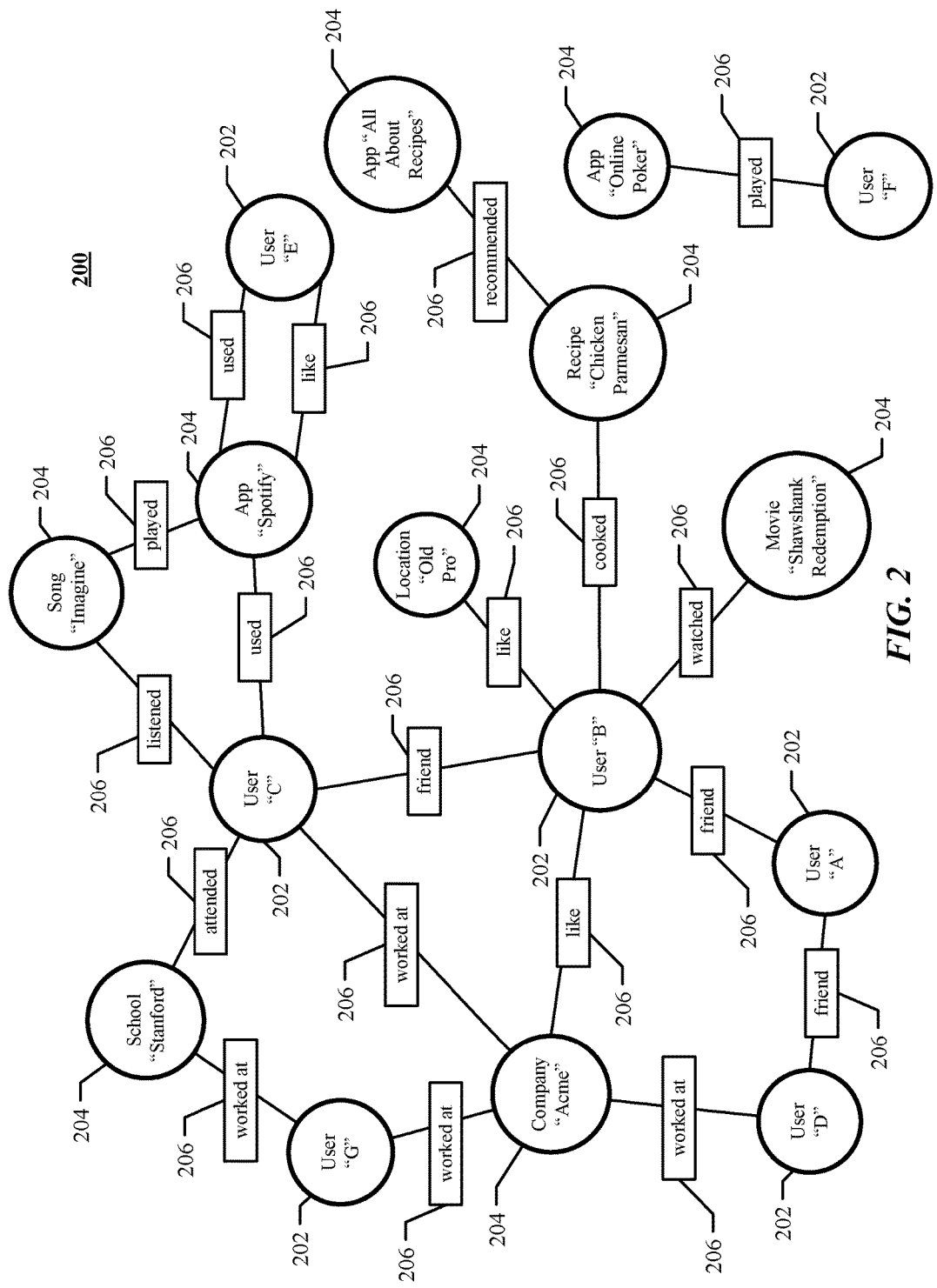
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other interactable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Geographic Location

In particular embodiments, the geographic location (hereinafter also simply "location") of a mobile client system 130 equipped with cellular, Wi-Fi, GPS, or other suitable capabilities may be identified with geographic-positioning signals. The geographic location of a place or venue (e.g., a local coffee shop) may be identified and stored as an address, a set of geographic coordinates (latitude and longitude), a reference to another location (e.g., "the coffee shop next to the train station"), or using another suitable identifier. In particular embodiments, the mobile client system 130 may include one or more sensors that may facilitate geo-location functionalities of the system. Processing of sensor inputs by the mobile client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). As an example and not by way of limitation, geographic-positioning signals may be obtained by cellular tower triangulation, Wi-Fi positioning, GPS positioning, other suitable positioning signals, or any combination thereof. As another example and not by way of limitation, a geographic location of an Internet-connected computer can be identified by the computer's IP address. A mobile client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile client system 130 may access a mapping library (e.g., via a function call) that generates a map containing a GPS location obtained by a device driver interpreting a GPS signal from a GPS sensor, and display the map in the web browser application's graphical user interface. Although this disclosure describes determining location in a particular manner, this disclosure contemplates determining location in any suitable manner.

Figure 3:
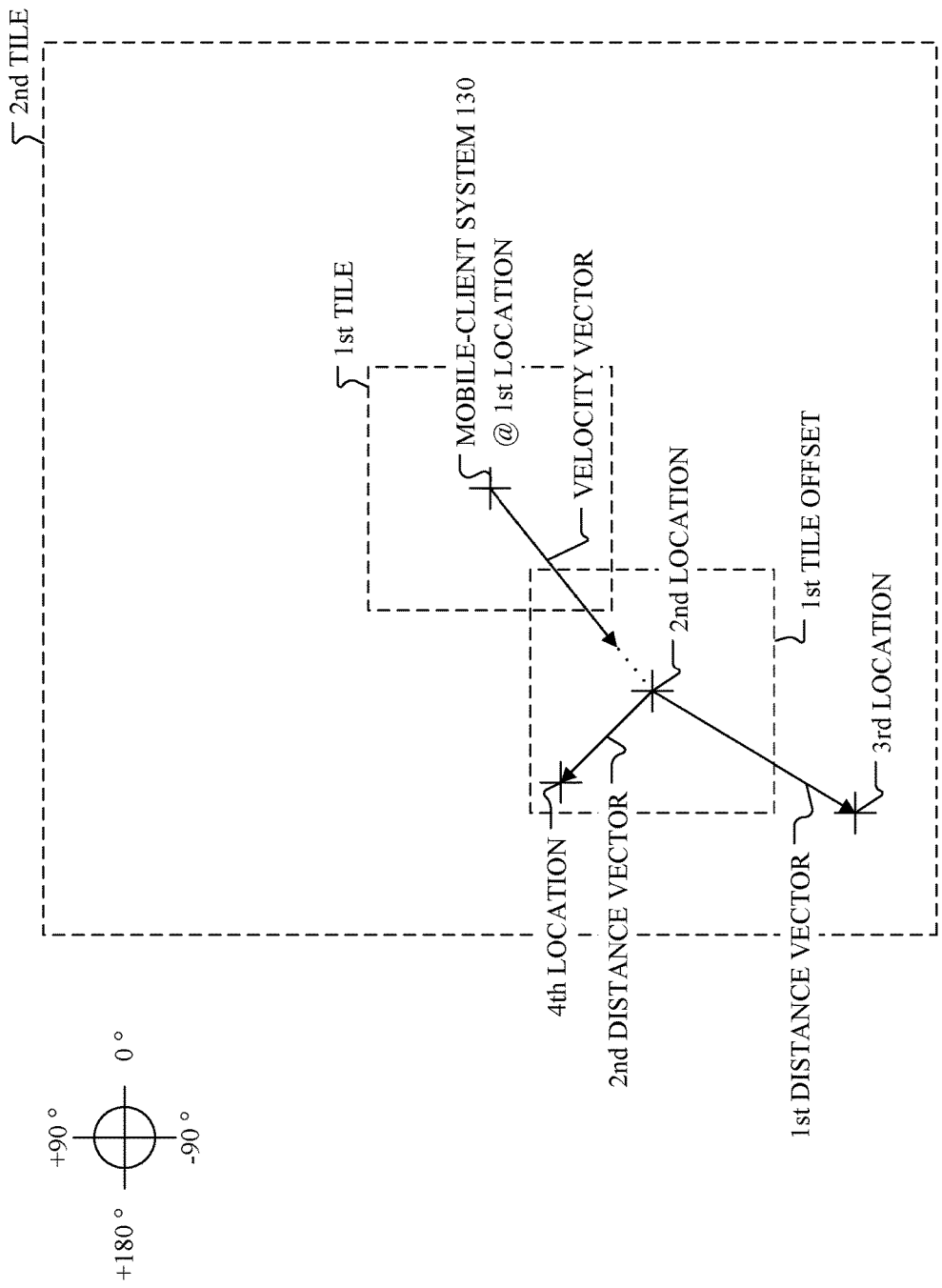
FIG. 3 illustrates an example map associated with velocity vectors.

FIG. 3 illustrates an example map associated with velocity vectors. In particular embodiments, a velocity vector of a mobile client system 130 may be determined. A velocity vector describes the speed of an object and the direction of its motion. As an example and not by way of limitation, the location of a mobile client system 130 may be identified over time. As the location of the mobile client system 130 changes, the rate of change of its location may be used to determine the velocity of the mobile client system 130. Similarly, the current location of the mobile client system 130 may be compared to a prior location of the mobile client system 130 to determine the direction of its motion. Although this disclosure describes determining velocity vectors in a particular manner, this disclosure contemplates determining velocity vectors in any suitable manner.

In particular embodiments, the mobile client system 130 may automatically capture location, direction, and velocity data of the mobile client system 130. This data may be captured by a special-purpose client application hosed on the mobile client system 130, which may capture the data continuously, periodically, semi-periodically, in response to particular events, or at any other suitable time. The location, direction, and velocity data of the mobile client system 130 may be transmitted to the social-networking system 160, or another suitable system. Although this disclosure describes capturing particular data in a particular manner, this disclosure contemplates capturing any suitable data in any suitable manner.

In particular embodiments, the social-networking system 160 may maintain a database of information relating to geographic positions or places (hereinafter referred to collectively as "locations"). Locations may correspond to particular geographic coordinates (such as, for example, GPS coordinates), or to particular physical venues (such as, for example, parks, landmarks, restaurants, bars, train stations, airports, etc.). The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, filed 19 Apr. 2010, which is incorporated by reference herein). The social-networking system 160 may allow users to access information regarding a location using a client application (e.g., a web browser or other suitable application) hosted by a mobile client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile client system 130 of the user (or a web- or network-based application using a browser client). The client application may automatically access GPS or other geo-location functions supported by the mobile client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile client system 130, access the geo-social-networking system to register the user's presence at the location. The social-networking system 160 may automatically checks in a user to a location based on the user's current location and past location data (such as, for example, as described in U.S. patent application Ser. No. 13/042,357, filed 7 Mar. 2011, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

Vector Spaces and Embeddings

Figure 4:
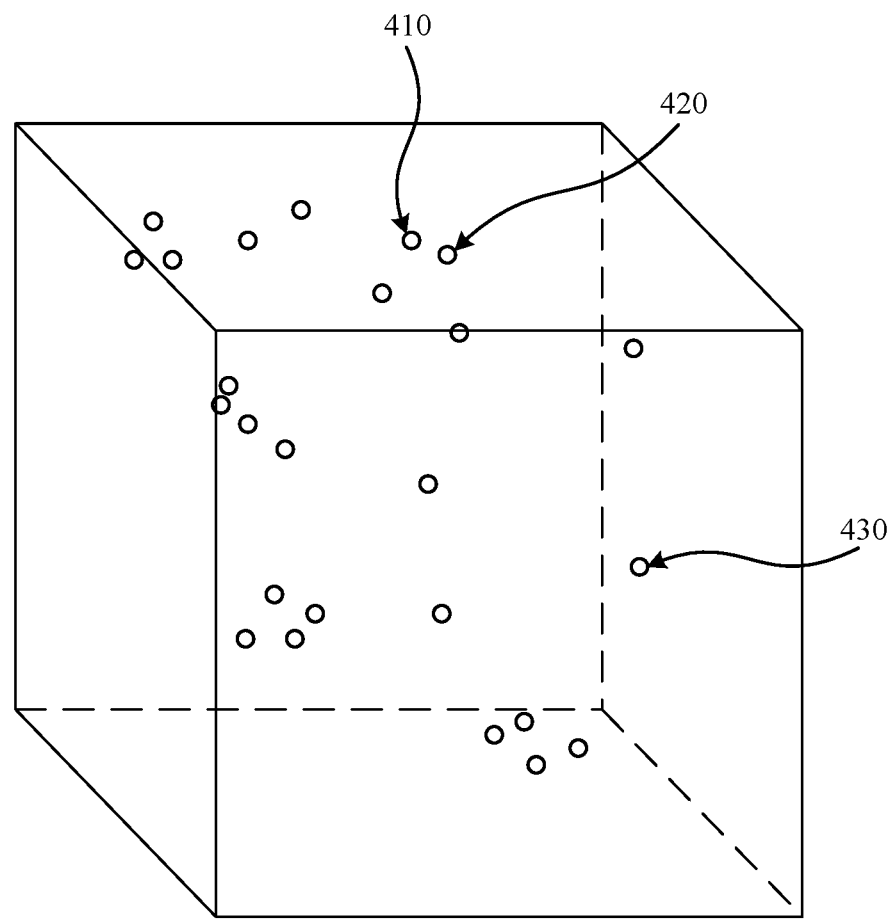
FIG. 4 illustrates an example view of a vector space.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4. An n-gram may be mapped to a respective vector representation. As an example and not by way of limitation, n-grams $t_1$ and $t_2$ may be mapped to vectors $\vec{v}_1$ and $\vec{v}_2$ in the vector space 400, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. As an example and not by way of limitation, objects $e_1$ and $e_2$ may be mapped to vectors $\vec{v}_1$ and $\vec{v}_2$ in the vector space 400, respectively, by applying a function $\vec{\pi}$, such that $\vec{v}_1 = \vec{\pi}(e_1)$ and $\vec{v}_2 = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ may be a cosine similarity $\vec{v}_1 \cdot \vec{v}_2 / \|\vec{v}_1\| \|\vec{v}_2\|$. As another example and not by way of limitation, a similarity metric of $\vec{v}_1$ and $\vec{v}_2$ may be a Euclidean distance $\|\vec{v}_1 - \vec{v}_2\|$. A similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Managing Delivery of Messages

Figure 5:
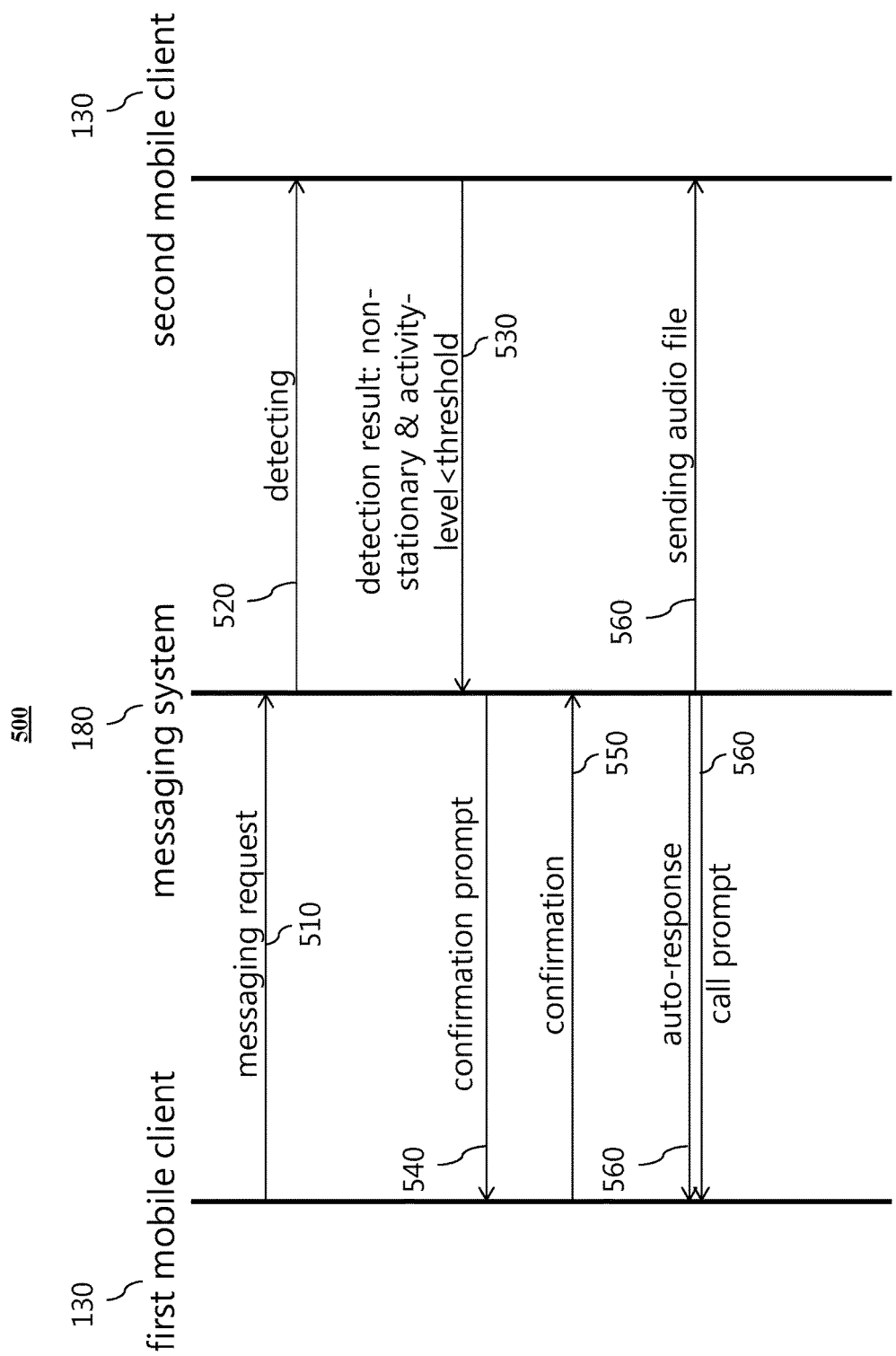
FIG. 5 illustrates an example flow diagram of interactions between a first and a second mobile clients and a messaging system.

In particular embodiments, the messaging system 180 may improve the management of delivering messages to the mobile client system 130 (also referred to simply as a "mobile client") of a non-stationary user (receiver) from another user (sender). The messaging system 180 may automatically detect that the receiver is non-stationary and active at a certain activity-level on another application (e.g., the receiver is actively browsing their newsfeed on a social-networking application, or the receiver has closed the social-networking application on his/her mobile client system 130), and accordingly perform a particular protocol for delivering the message from the sender to the receiver. The protocol may decrease the likelihood that the message is sent to the receiver when the receiver is engaged in another activity. The messaging system 180 may base its detection on the receiver's velocity and whether the receiver is currently active on another application the messaging system 180 can monitor (e.g., the messaging application 180 may have access to activity information from a social-networking application on the mobile client system 130 of the receiver). The messaging system 180 may further determine that the receiver's activity information indicates the user is engaged in another activity and thus is unlikely to respond to the sender's message or may be distracted by the sender's message (e.g., the receiver is moving at a relatively high velocity) based on a machine-learning model. The messaging system 180 may subsequently send a confirmation prompt to the sender asking the sender to confirm that the message should be sent. If the sender confirms that the message should be sent, the messaging system 180 may perform a particular protocol for delivering the message, which may include holding the message until the messaging system 180 detects the user's activity-level indicates that the user is able to respond to the message, sending the message as an audio file, prompting the sender to call the receiver (rather than sending the message), or other suitable actions. FIG. 5 illustrates an example flow diagram of interactions between a first and a second mobile clients 130 and the messaging system 180. As an example and not by way of limitation, at step 510 a first user may request to send a text message to a second user via the Facebook Messenger application on his/her smart phone. At step 520, the messaging system 180 may detect the velocity of the second user and whether the second user is active on another application the messaging system 180 can monitor (e.g., Facebook Mobile, Instagram, etc.). At step 530 the messaging system 180 may detect that the second user is moving at 7 miles per hour and he/she is not active on the application. For example, the second user may be jogging/running in this scenario. At step 540, the messaging system 180 may then tell the first user the second user is probably running and confirm with the first user if he/she still wants to send the text message. If, at step 550, the first user confirms that the text message should be sent, the messaging system 180 may perform a few different actions at step 560. For example, the messaging system 180 may save the text message to a database on a server and generate an auto-response for display to the first user (e.g., "Your message is saved and will be delivered later."). Although this disclosure describes managing the delivery of messages via a messaging system, this disclosure contemplates managing the delivery of any suitable type of communication (e.g., phone calls, video calls, etc.) via any suitable system.

In particular embodiments, the messaging system 180 may receive, from a first mobile client system 130 associated with a first user via a messaging application running on the first mobile client system 130, a request to send a message to a second user. In particular embodiments, the messaging system 180 may receive, from the second mobile client system 130 associated with the second user, the location information associated with the second user. In particular embodiments, the messaging system 180 may subsequently access location information associated with the second user. The location information may comprise a velocity of the second mobile client system 130. As an example and not by way of limitation, the location information may indicate that the second user is currently on highway 101 and moving at a speed of 50 miles per hour. In particular embodiments, the messaging system 180 may determine the velocity of the second mobile client system 130 based on a history of geographic location coordinates associated with the second mobile client system 130 recorded over a pre-defined time window. As an example and not by way of limitation, the pre-defined time window may be one minute, one hour, or another suitable length of time. As another example and not by way of limitation, a user's coordinate at a current time may be 37.4241° N, 122.1661° W and the user's coordinate half an hour ago may be 29.047° N, 8.8947° W. The messaging system 180 may determine the velocity of the user based on these two coordinates and the time of half an hour. Although this disclosure describes location information in a particular manner, this disclosure contemplates any suitable location information in any suitable manner.

In particular embodiments, the messaging system 180 may receive, from the second mobile client system 130 associated with the second user via an application running on the second mobile client system 130, an indication that the second user is active on the application. In particular embodiments, the messaging system 180 may subsequently access activity information associated with the second user. In particular embodiments, the messaging system 180 may access the activity information via the social-networking system 160. As an example and not by way of limitation, the social-networking system 160 may have direct access to the activity information of a user on a social-networking application such as Instagram whereas the messaging system 180 may not. Thus, the messaging system 180 may make API calls to the social-networking system 160 to get the activity information of the user. The activity information may indicate whether the second user is currently active on the application running on the second mobile client system 130. As an example and not by way of limitation, a user may be active on a social-networking application (e.g., Instagram) if the user is constantly interacting with the social-networking application on a mobile client system 130 associated with the user. For example, the user may scroll up and down the posts, like the posts, comment on the post, etc. In particular embodiments, the messaging system 180 may have permissions to access the activity information of whether a user is active on an application running on the mobile client system 130 of the user. In particular embodiments, the application may give the permissions based on privacy settings of the user. As an example and not by way of limitation, the user may be asked if he/she permits his/her activity information on a social-networking application (e.g., Instagram) to be accessible when installing the social-networking application on his/her phone. Although this disclosure describes using a particular application for accessing activity information in a particular manner, this disclosure contemplates using any suitable application (e.g., a game application) for accessing activity information in any suitable manner.

Figure 6:
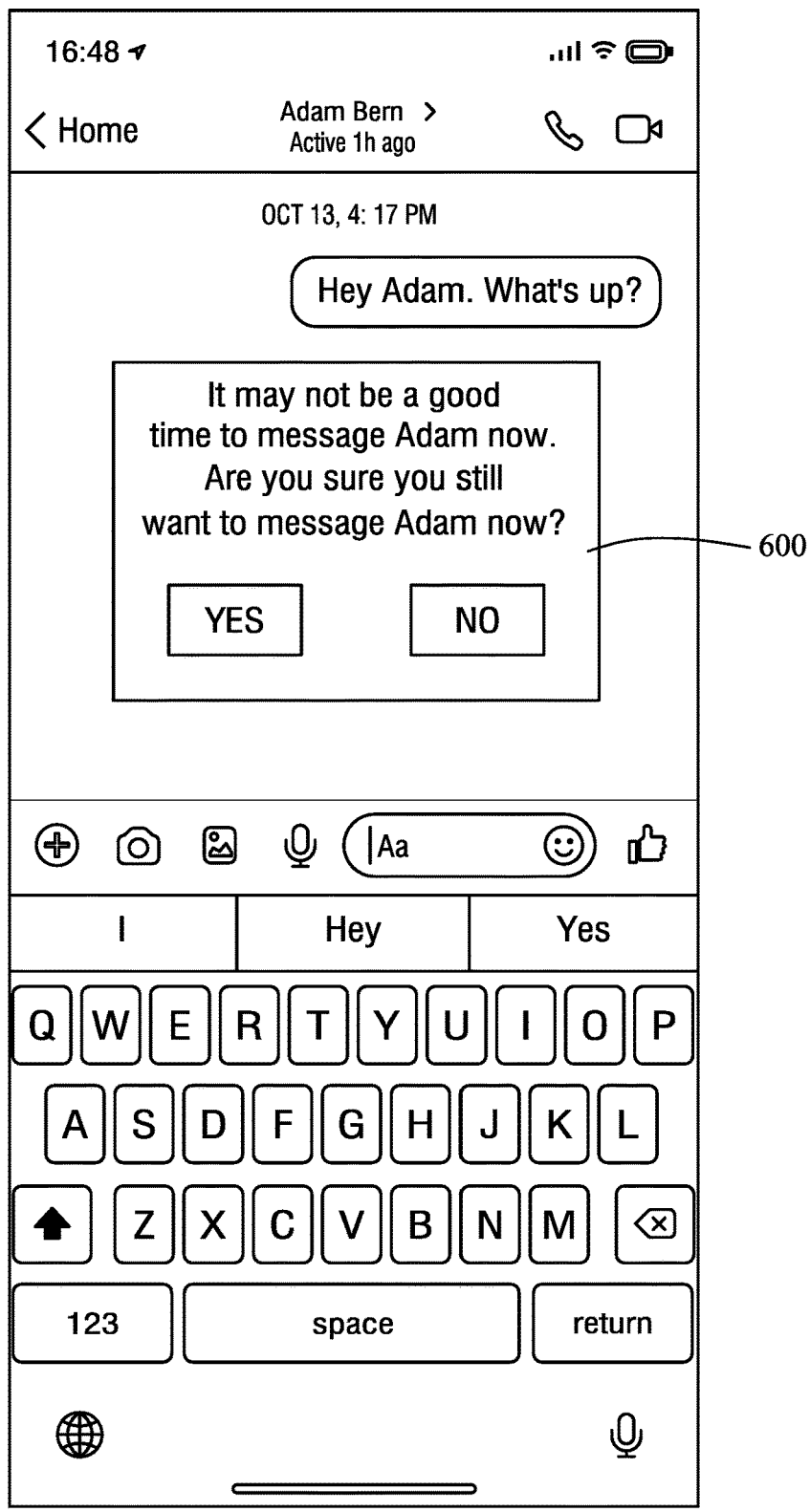
FIG. 6 illustrates an example confirmation prompt.

In particular embodiments, the messaging system 180 may determine an activity-level of the second user with respect to the second mobile client system 130 based on whether the second user is currently active on an application running on the second mobile client system 130 if the velocity of the second mobile client system 130 indicates the second mobile client system 130 is non-stationary. In particular embodiments, the messaging system 180 may determine the activity-level of the second user only if the velocity of the second mobile client system 130 is greater than a threshold velocity. As an example and not by way of limitation, the threshold velocity may be 3.1 miles per hour. If the velocity of the mobile client system 130 of a user is below 3.1 miles per hour, the user may be walking. Thus, the messaging system 180 may not determine the activity-level of the user or perform any subsequent actions since responding to a message is unlikely to distract the user from walking. If the velocity of the mobile client of a user is above 3.1 miles per hour, the user may be running, riding a bicycle or driving. Correspondingly, the messaging system 180 may further determine the activity-level of the user and perform a particular protocol of delivering messages accordingly. In particular embodiments, the messaging system 180 may determine that the activity-level of the user is below a threshold activity-level. This information, in combination with the velocity of the mobile client system 130 of the user, may indicate that it is very likely that the user is engaging in another activity that may be distracted by incoming messages. As an example and not by way of limitation, a user moving at 50 miles per hour may be driving or may be just sitting in a passenger seat in a moving car. If the activity-level of the user is determined to be below a threshold activity-level, the messaging system 180 may be confident that the user is driving rather than sitting in a passenger seat. In particular embodiments, the messaging system 180 may then send, to the first mobile client system 130 associated with the first user via the messaging application running on the first mobile client system 130, a confirmation prompt for display to the first user. The confirmation prompt may be operable to allow the first user to confirm whether the message to the second user should be sent. In particular embodiments, the messaging system 180 may otherwise determine that the activity is above a threshold activity-level. As an example and not by way of limitation, continuing with the previous example, the activity-level being above a threshold activity-level may indicate that the user is sitting in a passenger seat in a moving car rather than driving. As a result, the messaging system 180 may send, to the second mobile client system 130 associated with the second user via a messaging application running on the second mobile client system 130, the message from the first user. As illustrated, the aforementioned approach of analyzing both velocity information and activity information on an application may address the challenge of accurately detecting if a user is currently engaged in another activity (e.g., driving). FIG. 6 illustrates an example confirmation prompt 600. In this example, a user named "Rick Morris" may request to send a message to "Adam Bern" and the confirmation prompt 600 may be sent to "Rick Morris" through Facebook Messenger on his phone. In particular embodiments, the messaging application running on the first mobile client system 130 may be different from the application running on the second mobile client system 130. For example, the first user may be using Facebook Messenger to send the message whereas the second user may be using SMS to receive the message. Although this disclosure describes determining an activity-level in a particular manner, this disclosure contemplates determining any suitable activity-level in any suitable manner.

Figure 7:
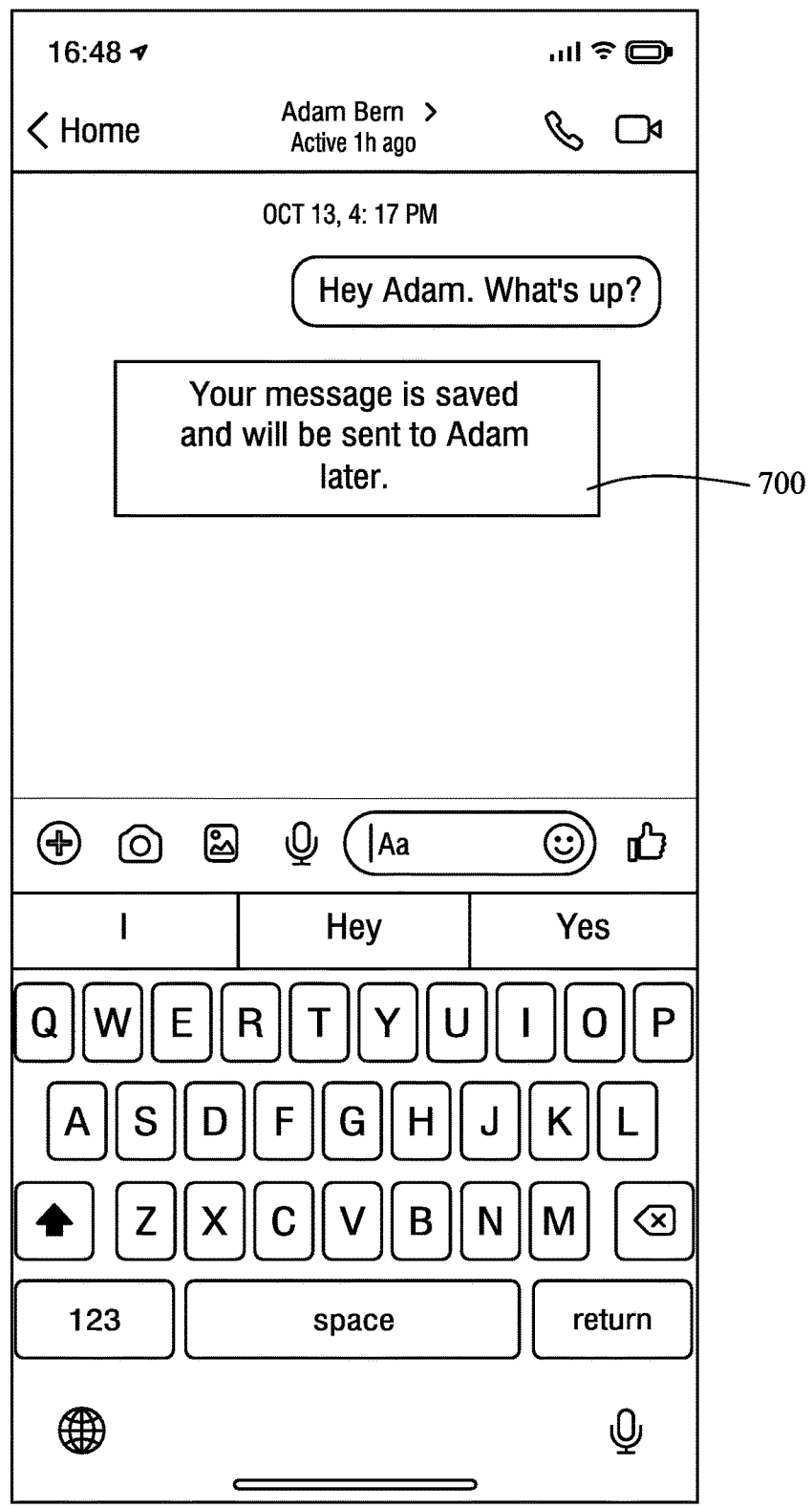
FIG. 7 illustrates an example auto-response.

In particular embodiments, the messaging system 180 may receive, from the first mobile client system 130 associated with the first user via the messaging application running on the first mobile client system 130, a confirmation that the message to the second user should be sent responsive to the confirmation prompt 600. In particular embodiments, the messaging system 180 may conduct a protocol for delivering the message from the first user to the second user responsive to the confirmation. In particular embodiments, the messaging system 180 may store the message from the first user in a data store associated with the computing systems and may not send the message to the second user yet. In particular embodiments, the messaging system 180 may then send an auto-response to the first mobile client system 130 associated with the first user via the messaging application running on the first mobile client system 130. FIG. 7 illustrates an example auto-response 700. In this example, the auto-response 700 may be sent to "Rick Morris" who requested to send a message to "Adam Bern". In particular embodiments, the messaging system 180 may send the stored message at a later time to the second mobile client system 130 associated with the second user via the messaging application running on the second mobile client system 130 after detecting two conditions. The first condition may include that the velocity of the second mobile client system 130 indicates the second mobile client system 130 is stationary. As an example and not by way of limitation, the second mobile client system 130 being stationary may indicate that the second user stopped driving and responding to the message may not cause distraction anymore. The second condition may include that the activity-level of the second user on an application the messaging system 180 can monitor is above a threshold activity-level. As another example and not by way of limitation, continuing with the previous example, the activity-level of the second user on the application being above a threshold activity-level may indicate that the second user switched positions with a passenger in his/her car and the passenger is driving now. Although this disclosure describes storing a message and sending it after certain conditions are met in a particular manner, this disclosure contemplates storing a message and sending it after any suitable conditions are met in any suitable manner.

Figure 8:
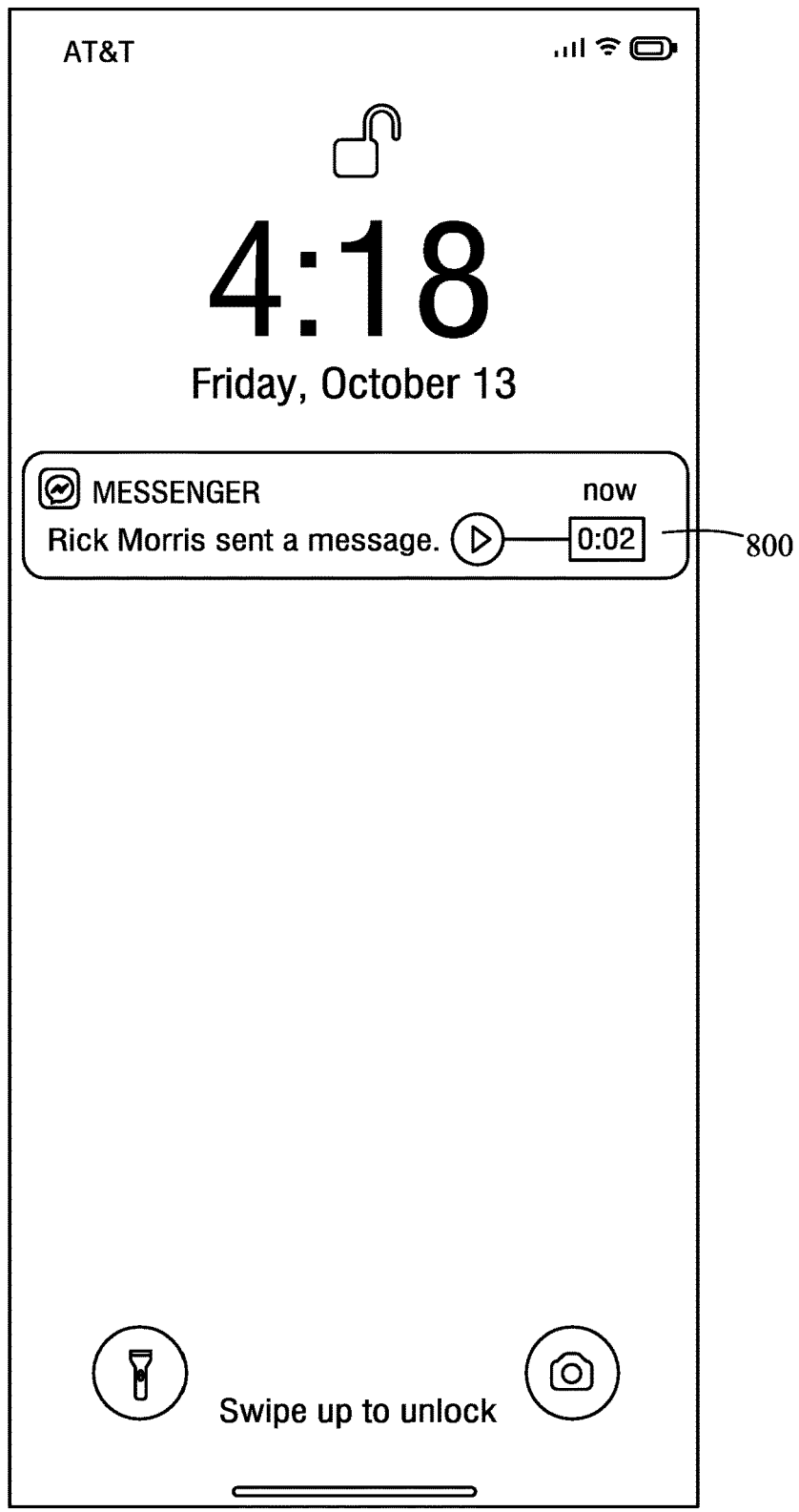
FIG. 8 illustrates an example play prompt of an incoming message by audio.

In particular embodiments, the messaging system 180 may conduct another protocol for delivering the message from the first user to the second user. In particular embodiments, the messaging system 180 may convert the message to an audio file. As an example and not by way of limitation, the messaging system 180 may convert a text message to a voice message based on text-to-speech technologies. As another example and not by way of limitation, the messaging system 180 may convert a video message to a voice message based on Automatic Speech Recognition (ASR) technologies. In particular embodiments, the messaging system 180 may subsequently send the audio file to the second mobile client system 130 associated with the second user via the messaging application running on the second mobile client system 130. In particular embodiments, the messaging system 180 may auto-play the audio file for the second user via the messaging application running on the second mobile client system 130. In particular embodiments, the messaging system 180 may alternatively send a play prompt to the second mobile client system 130. The second user may choose whether to play the audio message or not responsive to the play prompt. FIG. 8 illustrates an example play prompt 800 of an incoming message by audio. In this example, the play prompt 800 may be displayed at the home screen of the phone of "Adam Bern". The play prompt 800 may comprise the name of the sender (e.g., Rick Morris), a play button, and the length of the audio file converted from the text message. Although this disclosure describes sending a message as an audio file in a particular manner, this disclosure contemplates sending any suitable audio file in any suitable manner.

Figure 9:
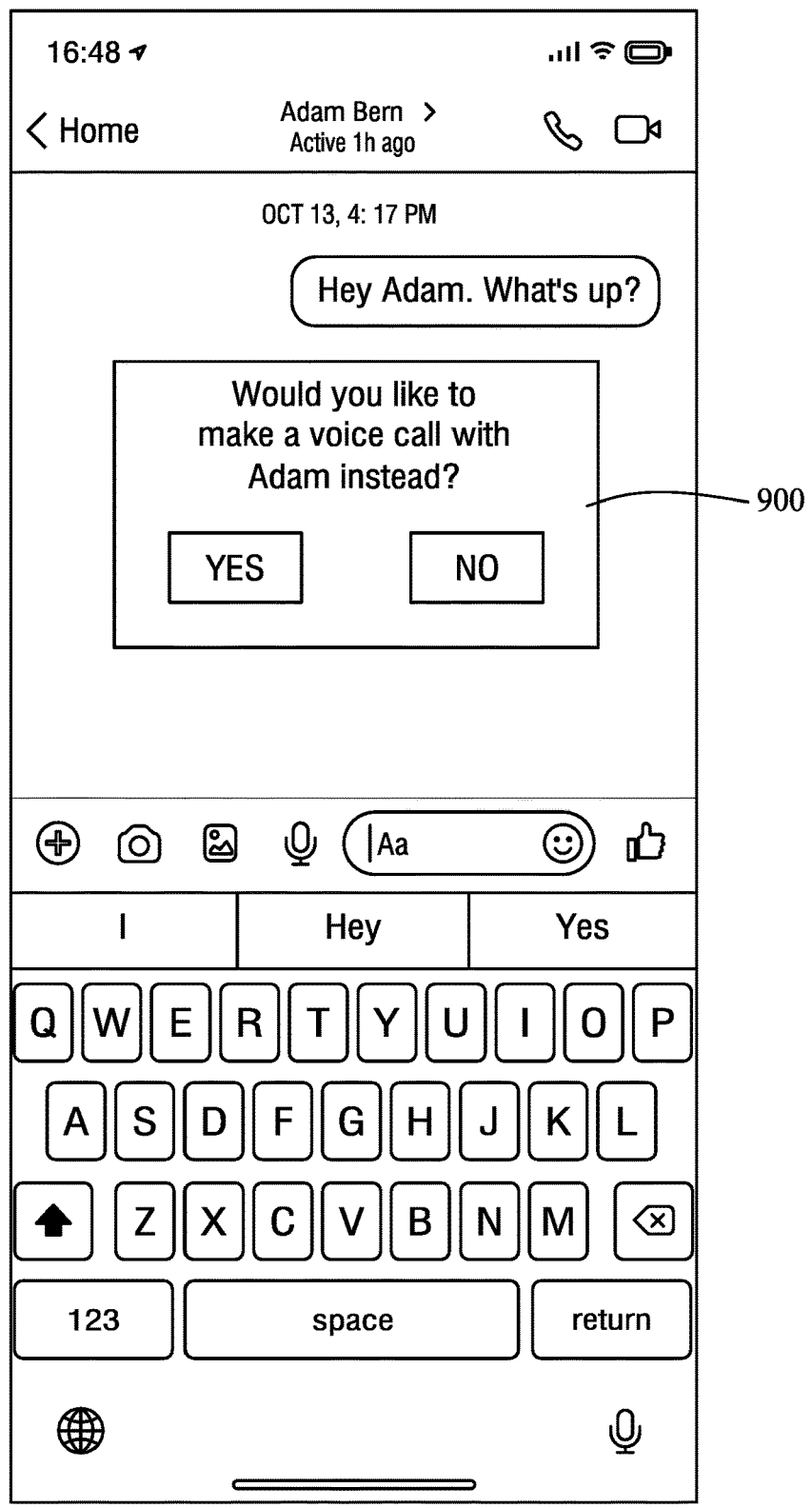
FIG. 9 illustrates an example call prompt.

In particular embodiments, the messaging system 180 may conduct another protocol for delivering the message from the first user to the second user. In particular embodiments, the messaging system 180 may send, to the first mobile client system 130 associated with the first user via the messaging application running on the first mobile client system 130, a call prompt for display to the first user. The call prompt may be operable to allow the first user to initiate a voice call with the second user. FIG. 9 illustrates an example call prompt. In this example, the call prompt 900 may be sent to "Rick Morris" who requested to send a message to "Adam Bern". Although this disclosure describes a call prompt in a particular manner, this disclosure contemplates any suitable call prompt in any suitable manner.

In particular embodiments, the messaging system 180 may determine the protocol for delivering the message from the first user based on settings of the messaging application running on the second mobile client system 130 made by the second user. As an example and not by way of limitation, a messaging application (e.g., Facebook Messenger), when being installed on a phone, may ask a user how he/she would like the application to process an incoming message when he/she is unable to respond. The user may select from a few options such as "storing the message temporarily and sending it to me when I can respond", "sending the message to me as an audio file", "asking the sender to call me instead", etc. Although this disclosure describes settings of a messaging application with respect to incoming messages in a particular manner, this disclosure contemplates any suitable settings of a messaging application with respect to incoming messages in any suitable manner.

FIG. 10 illustrates an example activity-level index 1000. In particular embodiments, the messaging system 180 may determine the activity-level of the second user in the following way. The messaging system 180 may access an activity-level index 1000. The activity-level index 1000 may comprise a plurality of entries corresponding to a plurality of users on an online social network. Each entry in the activity-level index 1000 may comprises: (1) a unique identifier of a user, and (2) a value of the activity-level of the user associated with the unique identifier. Although this example describes an identifier and a value of the activity-level in particular formats, the method may use any suitable formats to represent an identifier and a value of the activity-level. Entries in the activity-level index 1000 may further comprise other suitable information related to the activity-level. As an example and not by way of limitation, the activity-level index 1000 illustrated in FIG. 10 includes several entries. The first (left) column indicates the identifiers of respective users, and the second (right) column indicates the corresponding values of the activity-level. Although this disclosure describes each entry of the activity-level index 1000 as having two components, this disclosure contemplates each entry comprising any suitable number of components. For example, each entry in the activity-level index

1000 may also comprise a timestamp associated with the corresponding value of the activity-level. The timestamp may indicate the exact time when the activity-level is obtained. The messaging system 180 may update the activity-level index 1000 from time to time so the timestamp may be updated from time to time accordingly. In particular embodiments, the messaging system 180 may search the activity-level index 1000 to identify an entry corresponding to the unique identifier associated with the second user. The messaging system 180 may further determine the activity-level of the second user based on the identified entry. As an example and not by way of limitation, the activity-level index 1000 illustrated in FIG. 10 indicates that the activity-level of user 1001 is 7. If a threshold activity-level is set as smaller than 7, user 1001 may be able to respond to a message without being distracted. Although this disclosure describes a particular activity-level index comprising particular information, this disclosure contemplates any suitable activity-level index comprising any suitable information. More information on search indexes may be found in U.S. patent application Ser. No. 14/858,195, filed 18 Sep. 2015, and U.S. patent application Ser. No. 15/680,096, filed 17 Aug. 2017, which are incorporated by reference.

In particular embodiments, the messaging system 180 may generate the activity-level index 1000 in the following way. The messaging system 180 may first calculate a value indicating the activity-level for each user of a plurality of users on an online social network. The calculation may be based on a machine-learning model. The messaging system 180 may subsequently store a plurality of entries in the activity-level index 1000. Each entry in the activity-level index 1000 may comprise: (1) a unique identifier of a user, and (2) the calculated value of activity-level of the user associated with the unique identifier. Although this disclosure describes generating particular activity-level indexes in a particular manner, this disclosure contemplates generating any suitable activity-level indexes in any suitable manner.

In particular embodiments, the messaging system 180 may train the machine-learning model in the following way. The messaging system 180 may access a plurality of training samples from a training data set. The training samples may comprise one or more of the following data. The training samples may comprise one or more signals associated with a plurality of users on an online social network, respectively. The one or more signals may be associated with one or more timestamps and may be collected over a prior time window. The prior time window may be a pre-specified period of time prior to a current time and the length of the period may vary depending on the particular embodiment. As an example and not by way of limitation, the time window may be one day, one week, two weeks, one month, or another suitable length of time. The training samples may also comprise known activity-levels on an application associated with each of the plurality of users corresponding to the one or more signals, respectively. The training samples may additionally comprise user feedback associated with each of the plurality of users. The feedback may be a user-selected activity-level on an application corresponding to the timestamp. As an example and not by way of limitation, the messaging system 180 may ask a user to select from multiple choices via the mobile client system 130 associated with the user about how active the user was on the application (e.g., Instagram) 10 minutes ago. Such feedback may help the messaging system 180 assess the accuracy of a trained machine-learning model, based on which the machine-learning model may be retrained, leading to a more robust machine-learning model. In particular embodiments, the messaging system 180 may formulate the one or more signals of each of the plurality of users into one or more feature vectors for each of the plurality of users. The messaging system 180 may further update the machine-learning model based on the following process. The messaging system 180 may first generate probabilities of respective activity-levels for the plurality of users based on the respective one or more feature vectors. The messaging system 180 may then re-train the machine-learning model based on a comparison between the generated probabilities and the user feedback. As an example and not by way of limitation, the machine-learning model may be based on a regression model. Although this disclosure describes training particular machine-learning models in a particular manner, this disclosure contemplates training any suitable machine-learning models in any suitable manner.

In particular embodiments, the one or more signals associated with a user may comprise one or more of the following information. The one or more signals may comprise motion information of a mobile client system 130 associated with the user. As an example and not by way of limitation, when a user is moving fast, he/she may be running and his/her activity-level on an application may be low, which is why the motion information may be useful for calculating a value of the activity-level. The one or more signals may also comprise location information of a mobile client system 130 associated with the user. As an example and not by way of limitation, if a user's location indicates that he/she is now on highway 101, he/she may be driving and his/her activity-level on an application may be low. By contrast, if a user's location indicates that he/she is now at home, his/her activity-level on an application may be high. The one or more signals may also comprise GPS information of a mobile client system 130 associated with the user. The one or more signals may also comprise camera information of a mobile client system 130 associated with the user. As an example and not by way of limitation, when a user is not facing the camera of his/her phone, his/her activity-level on an application may be low and vice versa. The one or more signals may additionally comprise time of the day. Time of the day may be useful because based on the collected data over a period of time, a pattern may be discovered with respect to the time. For example, the collected data over the past month may show that a user's activity-level on an applications was quite low from 7 am to 8 am and 6 pm to 7 pm during the week. As a result, this time information may be helpful for calculating the activity-level in the future. Collecting the aforementioned signals and training a machine-learning model based on them, therefore, may address the challenge of developing effective methods to determine the activity-level of a user with respect to an application running on his/her mobile client. Although this disclosure describes the one or more signals as comprising particular types of information, this disclosure contemplates the one or more signals as comprising any suitable type of information in any suitable manner.

In particular embodiments, the plurality of users of the training samples may have one or more common attributes with each other. The one or more common attributes may represent information the plurality of users have in common. The one or more attributes may also correspond to one or more nodes on a social graph, respectively. As an example and not by way of limitation, the attributes may include user age, sex, gender, ethnicity, religion, current location, town lived in, home town, likes, friends, school attended, game played, music listened to, video watched, organization worked at, or a combination thereof. In particular embodiments, the messaging system 180 may select the plurality of users based on a clustering algorithm, which may be further based on the one or more common attributes of the plurality of user. As an example and not by way of limitation, the clustering algorithm may be based on k-means. Although this disclosure describes selecting particular users as training samples in a particular manner, this disclosure contemplates selecting any suitable users as training samples in any suitable manner.

In particular embodiments, the messaging system 180 may calculate the value indicating the activity-level on an application for each of a plurality of users on an online social network based on a machine-learning model in the following way. The messaging system 180 may first receive, from a plurality of mobile clients 130 associated with the plurality of users, respectively, one or more signals associated with the respective user. The messaging system 180 may additionally adjust the machine-learning model for each of the plurality of users based on profile information of each of the plurality of users. A benefit of such adjustment may include obtaining a more accurate value of activity-level for a particular user because particular profile information associated with the user is considered when calculating the value based on the machine-learning model. The messaging system 180 may further calculate, for each user of the plurality of users, a value indicating the activity-level on an application using the adjusted machine-learning model based on the one or more signals. Although this disclosure describes calculating a value indicating an activity-level in a particular manner, this disclosure contemplates calculating any suitable value indicating any suitable activity-level in any suitable manner.

In particular embodiments, the messaging system 180 may train a plurality of machine-learning models based on a plurality of groups of users. In particular embodiments, the messaging system 180 may generate the plurality of groups of users by applying one or more clustering algorithms based on one or more attributes. For example, a number of people who work for Facebook may form a group and the messaging system 180 may train a machine-learning model particularly for the Facebook group. As a result, the trained machine-learning model for a particular group may be more suitable for any users from this group. As an example and not by way of limitation, to determine the activity-level of a user on an application running on his/her mobile client system 130, the messaging system 180 may identify which group the user belongs to, select the appropriate machine-learning model for the user accordingly, adjust the selected machine-learning model based on profile information of the user, and determine the activity-level of the user based on one or more signals associated with the user using the adjusted machine-learning model. For example, a user working at Facebook may have a hobby of photography. The messaging system 180 may select the machine-learning model trained for Facebook group, adjust the machine-learning model based on the user's hobby (e.g., the user may be more active on Instagram than other co-workers because the user likes photography) and then use the adjusted machine-learning model to determine the activity-level of this user on Instagram. Training a machine-learning model based on a group of people and then adjusting the machine-learning model for a particular user from that group may include the following benefits. First, the signals collected from one user may be sparse and may not be sufficient to train a reliable machine-learning model. By contrast, using signals from a group of people may overcome this limit. Meanwhile, the adjusted machine-learning model may further improve the accuracy for a particular user. Although this disclosure describes training particular machine-learning models for particular groups in a particular manner, this disclosure contemplates training any suitable machine-learning models for any suitable groups in any suitable manner.

In particular embodiments, the messaging system 180 may provide an API (application programming interface) to a third-party application running on a mobile client 130. In particular embodiments, the messaging system 180 may allow a third-party application to make API calls to use the functionality of managing delivery of messages to mobile clients 130 of non-stationary users. As a result, the embodiments disclosed herein may have a technical advantage of providing similar functionality to a variety of messaging applications running on mobile clients 130 such as SMS, iMessage, Facebook Messenger, Whatsapp, Snapchat, etc. As an example and not by way of limitation, a third-party application may inquire the activity-level of a user by providing an identifier of the user to the messaging system 180. Based on the identifier, the messaging system 180 may search the activity-level index 1000 and send the inquired information to the third-party application. As another example and not by way of limitation, a third-party application may provide similar management of delivering messages to non-stationary mobile clients by integrating a particular module in the implementation of the third-party application. The particular module may make API calls to the messaging system 180 using an identifier of a user to detect if the user may respond to a message from this third-party application without being distracted from his/her current engagement in another activity. For example, Snapchat may use a user's phone number to make API calls to the messaging system 180, based on which Snapchat can manage delivery of messages to the user with similar protocols, e.g. holding the message and generating an auto-response. Although this disclosure describes providing particular APIs to particular third-party applications in a particular manner, this disclosure contemplates providing any suitable APIs to any suitable third-party applications in any suitable manner.

Figure 11:
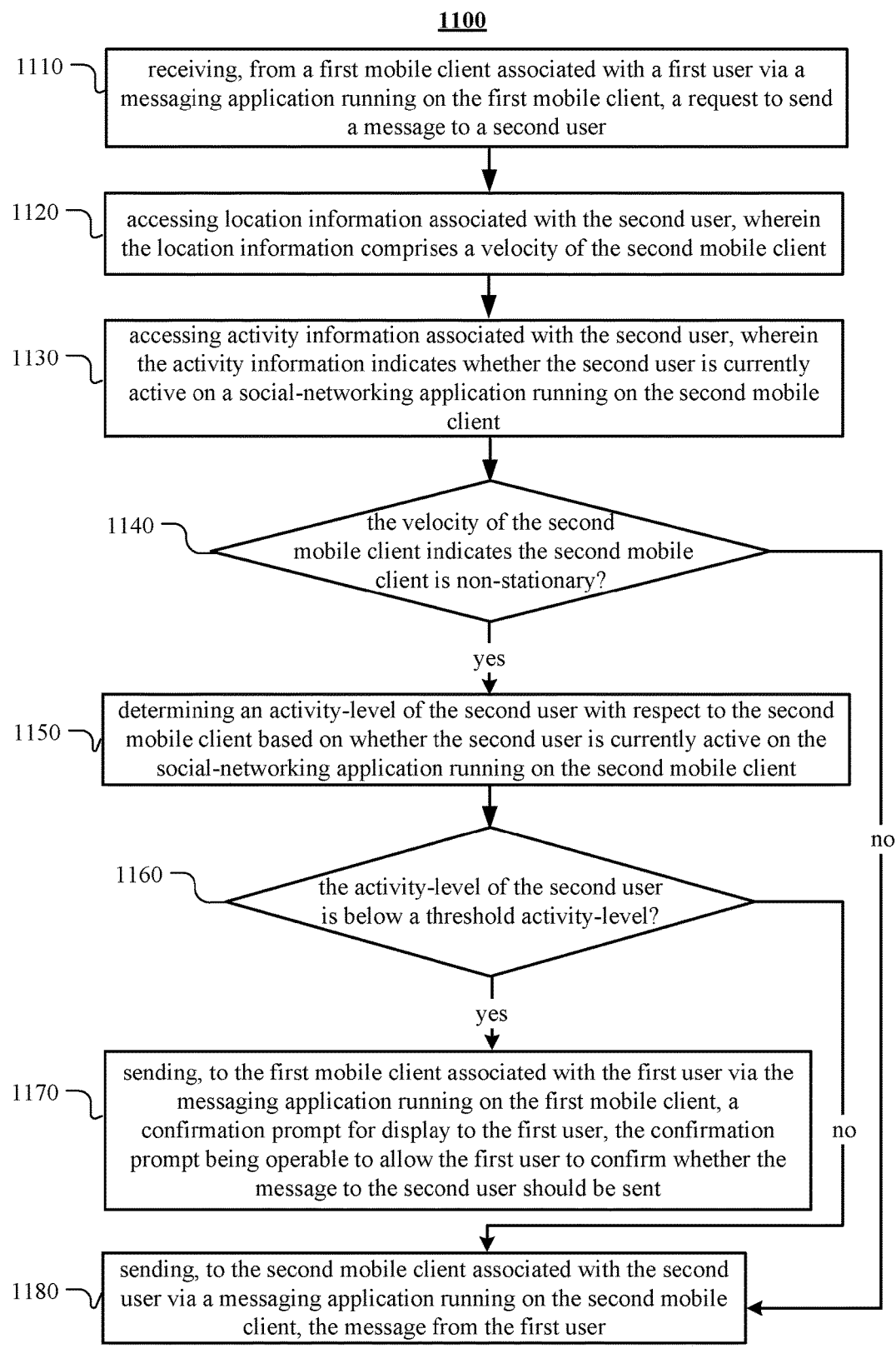
FIG. 11 illustrates an example method for managing delivery of messages to non-stationary mobile clients.

FIG. 11 illustrates an example method 1100 for managing delivery of messages to non-stationary mobile clients. The method may begin at step 1110, wherein the messaging system 180 may receive, from a first mobile client system 130 associated with a first user via a messaging application running on the first mobile client system 130, a request to send a message to a second user. At step 1120, the messaging system 180 may access location information associated with the second user, wherein the location information comprises a velocity of the second mobile client system 130. At step 1130, the messaging system 180 may access activity information associated with the second user, wherein the activity information indicates whether the second user is currently active on a social-networking application running on the second mobile client system 130. At step 1140, the messaging system 180 may determine if the velocity of the second mobile client system 130 indicates the second mobile client system 130 is non-stationary. If the velocity of the second mobile client system 130 indicates the second mobile client system 130 is non-stationary, the method may proceed to step 1150. If the velocity of the second mobile client system 130 does not indicate the second mobile client system 130 is non-stationary, the method may proceed to step 1180. At step 1150, the messaging system 180 may determine an activity-level of the second user with respect to the second mobile client system 130 based on whether the second user is currently active on the social-networking application running on the second mobile client system 130. At step 1160, the messaging system 180 may determine if the activity-level of the second user is below a threshold activity-level. If the activity-level of the second user is below a threshold activity-level, the method may proceed to step 1170. If the activity-level of the second user is not below a threshold activity-level, the method may proceed to step 1180. At step 1170, the messaging system 180 may send, to the first mobile client system 130 associated with the first user via the messaging application running on the first mobile client system 130, a confirmation prompt for display to the first user, the confirmation prompt being operable to allow the first user to confirm whether the message to the second user should be sent. At step 1180, the messaging system 180 may send to the second mobile client system 130 associated with the second user via a messaging application running on the second mobile client system 130, the message from the first user. Particular embodiments may repeat one or more steps of the method of FIG. 1100, where appropriate. Although this disclosure describes and illustrates particular steps of the method of FIG. 1100 as occurring in a particular order, this disclosure contemplates any suitable steps of the method of FIG. 1100 occurring in any suitable order. Moreover, although this disclosure describes and illustrates an example method for managing delivery of messages to non-stationary mobile clients including the particular steps of the method of FIG. 1100, this disclosure contemplates any suitable method for delivery of messages to non-stationary mobile clients including any suitable steps, which may include all, some, or none of the steps of the method of FIG. 1100, where appropriate. Furthermore, although this disclosure describes and illustrates particular components, devices, or systems carrying out particular steps of the method of FIG. 1100, this disclosure contemplates any suitable combination of any suitable components, devices, or systems carrying out any suitable steps of the method of FIG. 1100.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 12:
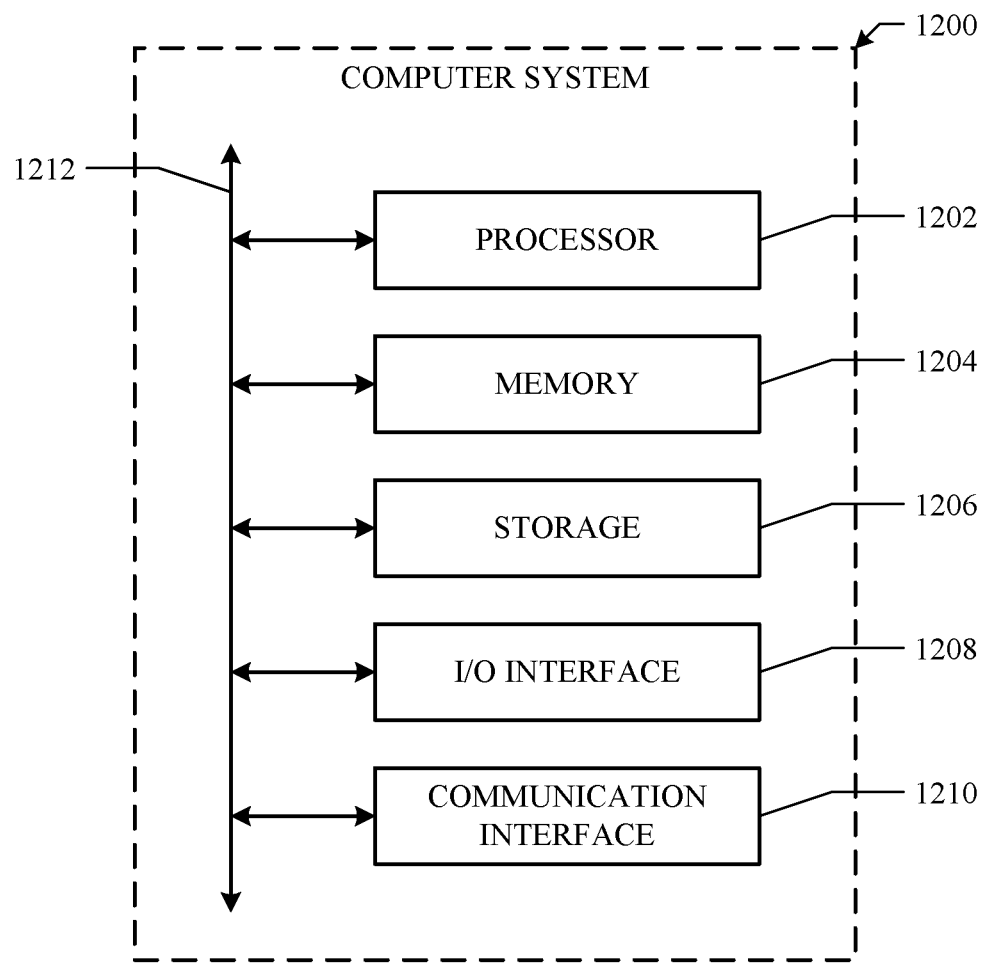
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving, from a first mobile client associated with a first user via a messaging application running on the first mobile client, a request to send a message to a second user;
    accessing location information associated with the second user, wherein the location information comprises a velocity of the second mobile client;

accessing, activity information associated with the second user, wherein the activity information indicates whether the second user is currently active on a social-networking application running on the second mobile client;

determining, based on the velocity of the second mobile client, that the second mobile client is non-stationary;

determining, responsive to the determination that the second mobile client is non-stationary, an activity-level of the second user with respect to the second mobile client based on whether the second user is currently active on the social-networking application running on the second mobile client; and based on the determined activity-level of the second user:
if the activity-level of the second user is below a threshold activity-level, then sending, to the first mobile client associated with the first user via the messaging application running on the first mobile client, a confirmation prompt for display to the first user, the confirmation prompt being operable to allow the first user to confirm whether the message to the second user should be sent;
else if the activity-level of the second user is not below the threshold activity-level, sending, to the second mobile client associated with the second user via a messaging application running on the second mobile client, the message from the first user.

2. The method of claim 1, wherein determining the activity-level of the second user is performed only if the velocity of the second mobile client is greater than a threshold velocity.

3. The method of claim 1, further comprising receiving, from the second mobile client associated with the second user, the location information associated with the second user.

4. The method of claim 1, further comprising receiving, from the second mobile client associated with the second user via the social-networking application running on the second mobile client, an indication that the second user is active on the social-networking application.

5. The method of claim 1, wherein the velocity of the second mobile client is determined based on a history of geographic location coordinates associated with the second mobile client recorded over a pre-defined time window.

6. The method of claim 1, wherein the social-networking application permits the one or more computing systems to access information of whether a user is currently active on the social-networking application based on privacy settings of the user.

7. The method of claim 1, further comprising:
receiving, from the first mobile client associated with the first user via the messaging application running on the first mobile client, a confirmation that the message to the second user should be sent responsive to the confirmation prompt.

8. The method of claim 7, further comprising:
storing the message from the first user in a data store associated with the computing systems;
sending an auto-response to the first mobile client associated with the first user via the messaging application running on the first mobile client; and
sending the stored message to the second mobile client associated with the second user via the messaging application running on the second mobile client after detecting that: (1) the velocity of the second mobile client indicates the second mobile client is stationary, or (2) the activity-level of the second user with respect to the second mobile client is above a threshold activity-level.

9. The method of claim 7, further comprising:
sending the message as an audio file to the second mobile client associated with the second user via the messaging application running on the second mobile client, wherein the audio file is playable via the messaging application.

10. The method of claim 7, further comprising:
sending, to the first mobile client associated with the first user via the messaging application running on the first mobile client, a call prompt for display to the first user, the call prompt being operable to allow the first user to initiate a voice call with the second user.

11. The method of claim 7, further comprising:
determining a protocol for delivering the message from the first user based on settings of the messaging application running on the second mobile client made by the second user.

12. The method of claim 1, wherein determining the activity-level of the second user comprises:
accessing an activity-level index comprising a plurality of entries corresponding to a plurality of users on an online social network, wherein each entry in the activity-level index comprises: (1) a unique identifier of a user, and (2) a value of the activity-level of the user associated with the unique identifier;
searching the activity-level index to identify an entry corresponding to the unique identifier associated with the second user; and
determining the activity-level of the second user based on the identified entry.

13. The method of claim 12, further comprising:
generating the activity-level index by:
calculating, a value indicating the activity-level on a social-networking application for each user of a plurality of users on an online social network based on a machine-learning model;
storing, in the activity-level index, a plurality of entries, wherein each entry comprises: (1) a unique identifier of a user, and (2) the calculated value of activity-level of the user associated with the unique identifier.

14. The method of claim 13, wherein calculating a value indicating the activity-level on a social-networking application for each of a plurality of users on an online social network based on a machine-learning model comprises:
receiving, from a plurality of mobile clients associated with the plurality of users, respectively, one or more signals associated with the respective user;
adjusting the machine-learning model based on profile information of each of the plurality of users; and
calculating, for each user of the plurality of users, a value indicating the activity-level on a social-networking application using the adjusted machine-learning model based on the one or more signals.

15. The method of claim 14, wherein the one or more signals associated with a user comprise one or more of:
motion information of a mobile client associated with the user;
location information of a mobile client associated with the user;
GPS information of a mobile client associated with the user; or
camera information of a mobile client associated with the user.

16. The method of claim 13, further comprising training the machine-learning model, the training comprises:
- accessing a plurality of training samples from a training data set, the training samples comprising one or more of: (1) one or more signals associated with a plurality of users on an online social network, respectively, wherein the one or more signals are associated with one or more timestamps and are collected over a prior time window, (2) known activity-levels on a social-networking application associated with each of the plurality of users corresponding to the one or more signals, respectively, or (3) user feedback associated with each of the plurality of users, wherein the feedback is a user-selected activity-level on a social-networking application corresponding to the timestamp;
- formulating the one or more signals of the plurality of users into one or more feature vectors for each of the plurality of users; and
- updating the machine-learning model, the updating comprising:
  - generating probabilities of respective activity-levels for the plurality of users based on the respective one or more feature vectors; and
  - re-training the machine-learning model based on a comparison between the generated probabilities and the user feedback.

17. The method of claim 16, wherein the plurality of users are selected based on a clustering algorithm.

18. The method of claim 16, wherein the plurality of users have one or more common attributes with each other.

19. The method of claim 18, wherein the one or more attributes correspond to one or more nodes on a social graph, respectively.

20. One or more computer-readable non-transitory storage media embodying software that is operable when executed to:
- receive, from a first mobile client associated with a first user via a messaging application running on the first mobile client, a request to send a message to a second user;
- access location information associated with the second user, wherein the location information comprises a velocity of the second mobile client;
- access activity information associated with the second user, wherein the activity information indicates whether the second user is currently active on a social-networking application running on the second mobile client;
- determine, based on if the velocity of the second mobile client, that the second mobile client is non-stationary;
- determine, responsive to the determination that the second mobile client is non-stationary, an activity-level of the second user with respect to the second mobile client based on whether the second user is currently active on the social-networking application running on the second mobile client; and
- based on the determined activity-level of the second user:
  - if the activity-level of the second user is below a threshold activity-level, then send, to the first mobile client associated with the first user via the messaging application running on the first mobile client, a confirmation prompt for display to the first user, the confirmation prompt being operable to allow the first user to confirm whether the message to the second user should be sent;
  - else if the activity-level of the second user is not below the threshold activity-level, send, to the second mobile client associated with the second user via a messaging application running on the second mobile client, the message from the first user.

21. A system comprising: one or more processors; and a non-transitory memory coupled to the processors comprising instructions executable by the processors, the processors operable when executing the instructions to:
- receive, from a first mobile client associated with a first user via a messaging application running on the first mobile client, a request to send a message to a second user;
- access location information associated with the second user, wherein the location information comprises a velocity of the second mobile client;
- access activity information associated with the second user, wherein the activity information indicates whether the second user is currently active on a social-networking application running on the second mobile client;
- determine, based on the velocity of the second mobile client, that the second mobile client is non-stationary;
- determine, responsive to the determination that the second mobile client is non-stationary, an activity-level of the second user with respect to the second mobile client based on whether the second user is currently active on the social-networking application running on the second mobile client; and
- based on the determined activity-level of the second user:
  - if the activity-level of the second user is below a threshold activity-level, then send, to the first mobile client associated with the first user via the messaging application running on the first mobile client, a confirmation prompt for display to the first user, the confirmation prompt being operable to allow the first user to confirm whether the message to the second user should be sent;
  - else if the activity-level of the second user is not below the threshold activity-level, send, to the second mobile client associated with the second user via a messaging application running on the second mobile client, the message from the first user.

* * * * *